United States Patent [19]

Meyer et al.

[11] Patent Number: 4,468,775
[45] Date of Patent: Aug. 28, 1984

[54] OPTICAL SELECTOR DEVICE USING A FIZEAU WEDGE FOR REFLECTION

[75] Inventors: Yves H. Meyer, Bures S. Yvette, France; Marin N. Nentchev, Sofia, Bulgaria

[73] Assignees: Centre National de la Recherche Scientifique, Paris, France; Institut Po Electronica PRI Ban Sofia, Sofia, Bulgaria

[21] Appl. No.: 310,335

[22] Filed: Oct. 9, 1981

[30] Foreign Application Priority Data

Oct. 9, 1980 [FR] France ............................... 80 21621

[51] Int. Cl.$^3$ ............................................... H01S 3/08
[52] U.S. Cl. ....................................... 372/92; 372/108; 372/20; 372/94; 372/98
[58] Field of Search ............... 372/92, 108, 93, 94, 372/98, 54, 86

[56] References Cited
PUBLICATIONS

"Tuning of Dye Lasers with a Reflecting Fizeau Wedge," Meyers et al., Opt. Comm., vol. 35, No. 1, (Oct. 1980).

Primary Examiner—John D. Lee
Assistant Examiner—Léon Scott, Jr.
Attorney, Agent, or Firm—Pollock, Vande Sande & Priddy

[57] ABSTRACT

When a sufficient reflectivity and a low absorption power are given to its dihedron of reflective surfaces, a Fizeau wedge can serve as a directional optical selector which supplies a narrow band of wavelengths in a first direction and the remainder of the incident wavelengths in another direction. A laser with colorant COL can then be defined by the Fizeau wedge CF and an output mirror $M_1$, with two diaphragms D interposed. Tuning is variable by relocation of the Fizeau wedge in its plane and relates either to a narrow line or a narrow gap in a wide band. Several lines can also be tuned separately.

19 Claims, 13 Drawing Figures

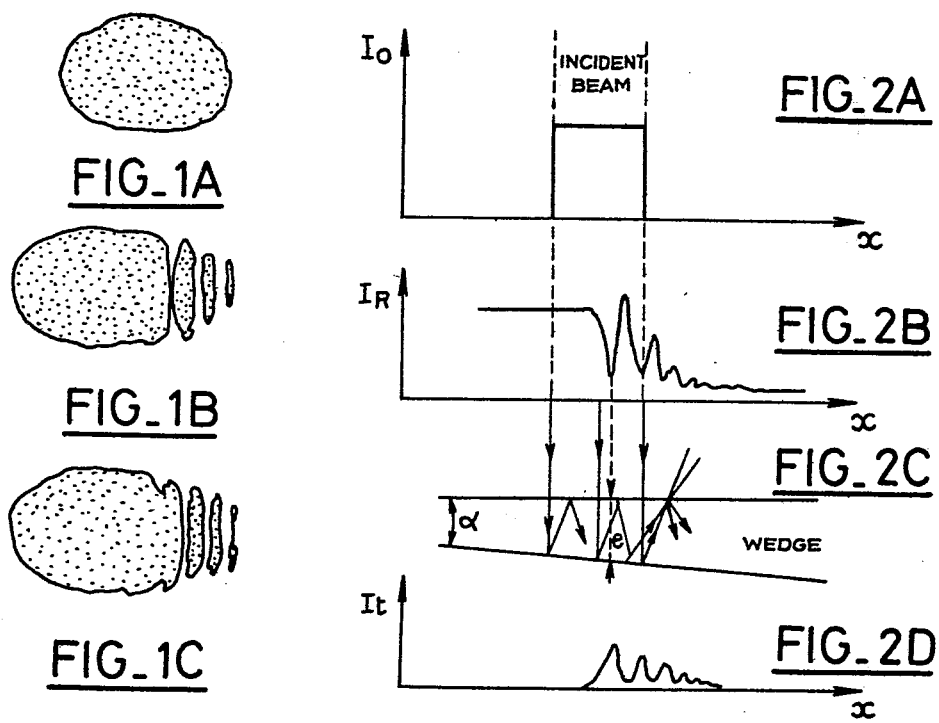
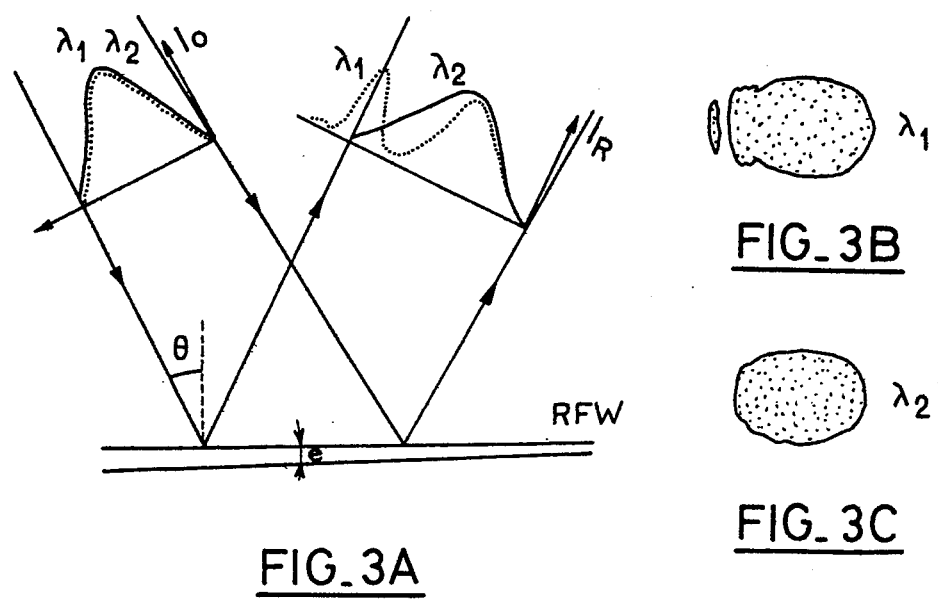

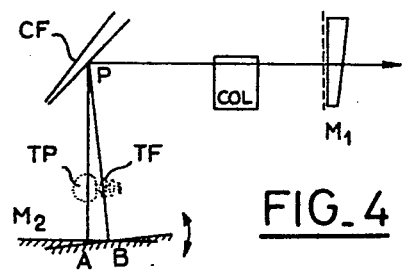
FIG_4
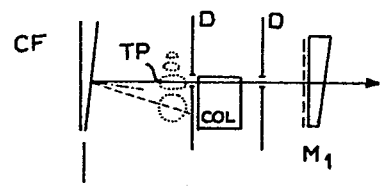
FIG_5
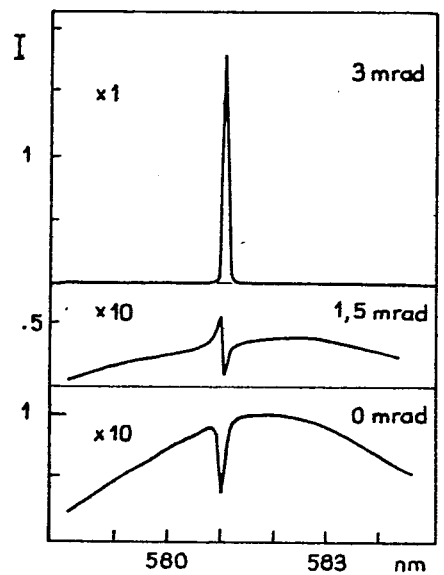
FIG_6C
FIG_6B
FIG_6A
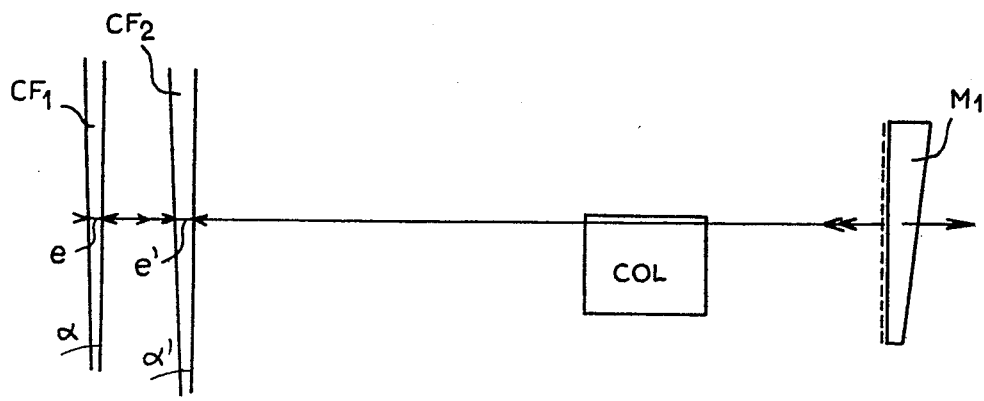
FIG_7A

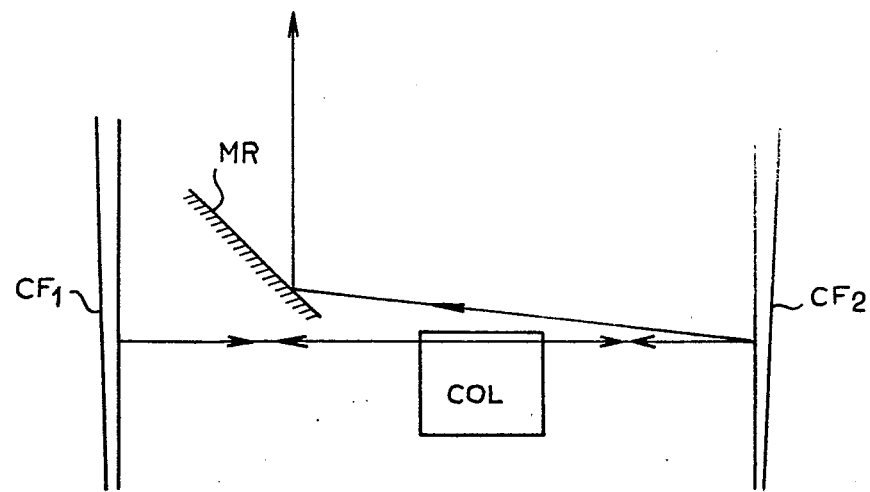
FIG_7B
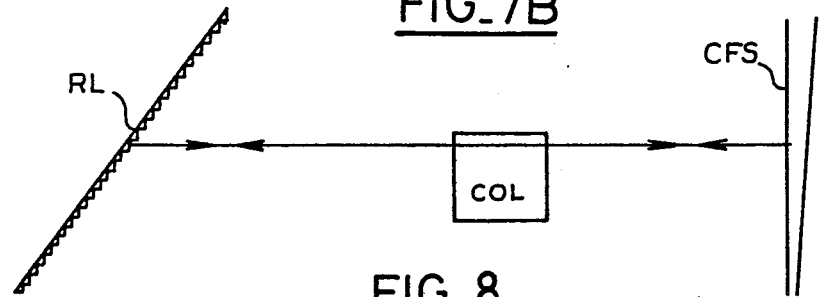
FIG_8
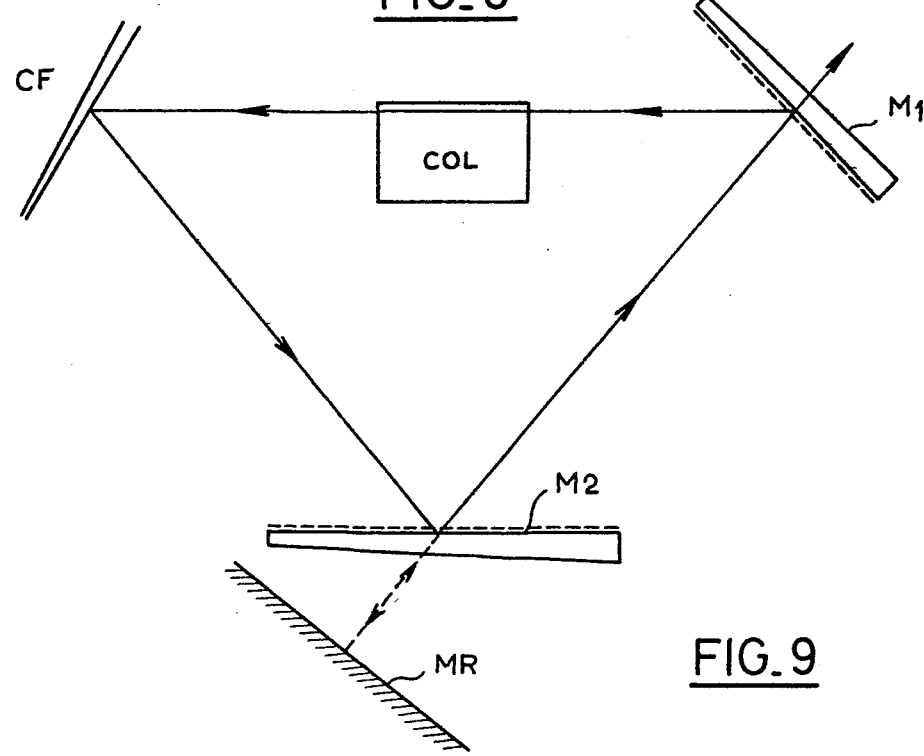
FIG_9

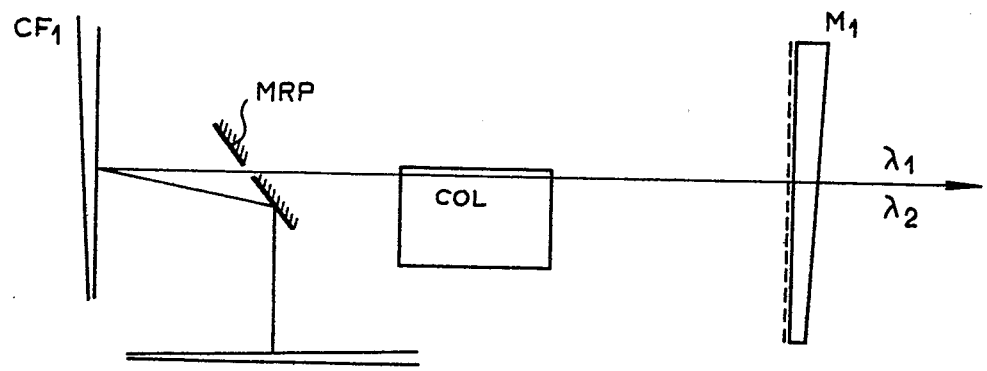
FIG_10
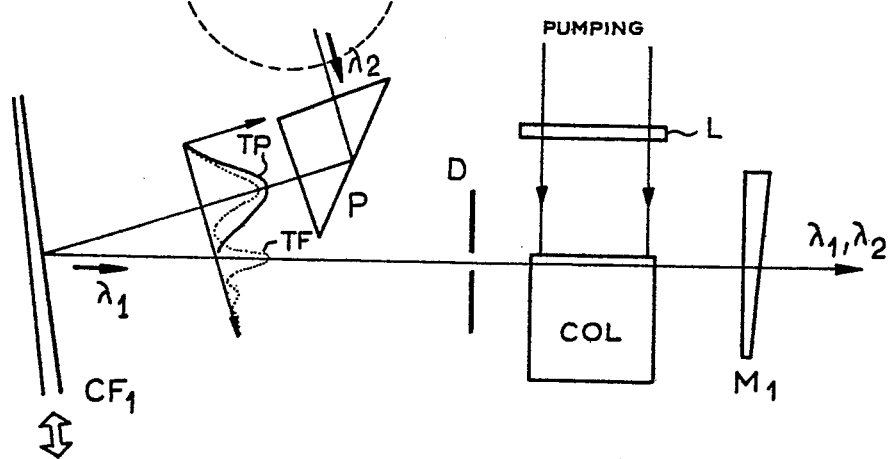
FIG_11
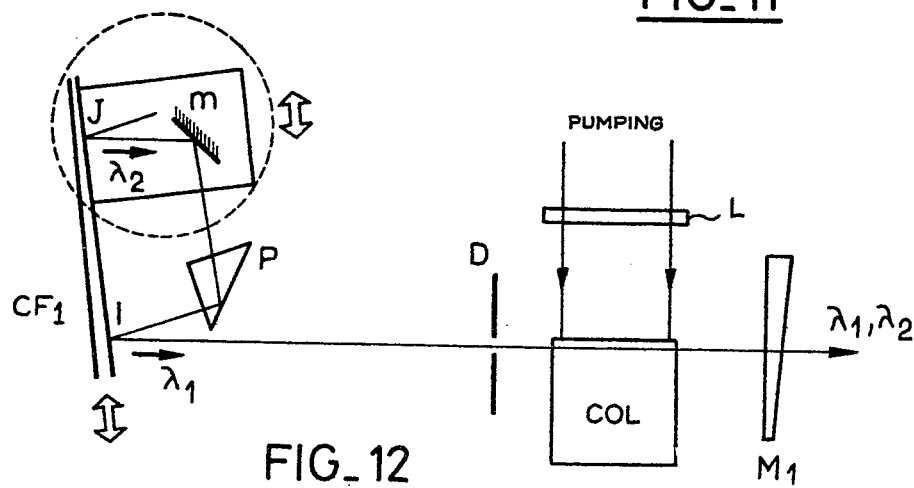
FIG_12

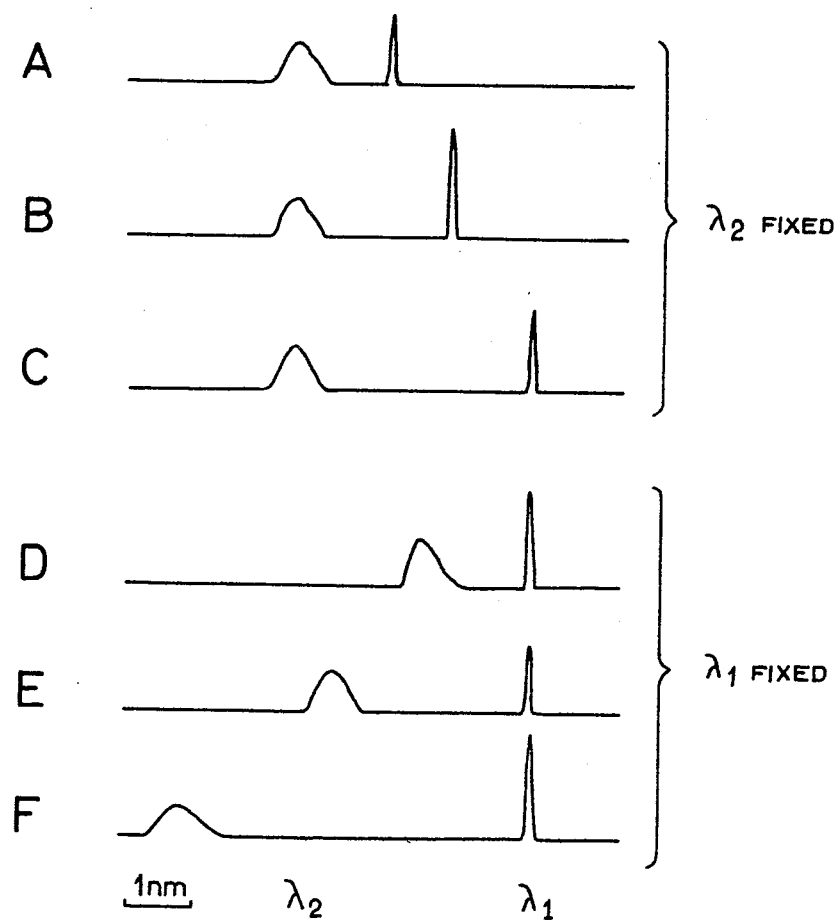
FIG_13

OPTICAL SELECTOR DEVICE USING A FIZEAU WEDGE FOR REFLECTION

BACKGROUND OF THE INVENTION

The invention relates to optics, and more particularly to selective optical means, especially those permitting the tuning of lasers.

Known selective optical devices are, for example, diffraction gratings and Fabry-Perot calibrators. Usually, it is necessary to use these with complementary devices which increase their bulk. In the field of lasers with variable tuning, the following selectors are often used:
  diffraction grating of large dimensions plus mirror;
  diffraction grating (in Littrow arrangement) plus an optical transmission system such as that known as telescopic (enlargement of the diameter of the beam);
  combination of a diffraction grating and a Fabry-Perot calibrator; and
  combination of two Fabry-Perot calibrators.

The laser cavities thus obtained are quite large and are subject to numerous different modes, which can be disadvantageous in certain applications.

SUMMARY OF THE INVENTION

The present invention provides a selective optical device which is at the same time a reflector and thus makes it possible in particular to produce shorter laser cavities.

The optical device known as a "Fizeau wedge" has two surfaces which are capable of partial reflection and are arranged a progressively variable distance apart (at least locally). In practice they are generally two plane surfaces forming a small angle between them.

In the past such a wedge was used with surfaces of average reflectivity and for the transmission of light.

Surprisingly, it has been observed that in choosing reflecting surfaces which have a higher reflectivity and are less absorbent, a selective optical device is obtained: on the one hand it reflects a narrow band of wavelengths in a certain direction; on the other hand it reflects the remainder of the incident wavelengths surrounding this narrow band in another direction which is the usual direction of reflection on a mirror. The parts of the reflected beam can then be utilized separately.

Although this phenomenon has been observed by the applicants in certain conditions for reflectivities between 0.6 and 0.9, it is considered preferable for the reflectivity to be higher than 0.9 in the present application. Very good results have been obtained with reflectivities close to 0.99.

The invention also proposes an optical device which incorporates at least one Fizeau wedge as defined above. As a general rule, such an optical device also includes means for directing a beam of light onto one of the surfaces of the Fizeau wedge. As indicated above, the latter is capable of selectively reflecting a narrow band of wavelengths in a certain direction and reflecting the remainder of the wavelengths surrounding that narrow band in another direction which is the usual direction of reflection on a mirror. The invention also provides means for utilizing one of the two reflected parts of the beam.

The beam incident on the Fizeau wedge is advantageously divergent.

In one important application of the invention the Fizeau wedge constitutes one of the reflecting walls of a laser cavity.

This application relates among other things to lasers with colorants and other wide-band lasers or tunable lasers, such as lasers with a colored centre, neodymium glass lasers, ruby lasers, and semiconductor lasers. The band width of these lasers generally covers several Angström units of wavelength.

In one embodiment, a perforated diaphragm is interposed between the Fizeau wedge and the light amplification medium.

According to one application, the Fizeau wedge is arranged so that it directly or indirectly (using a mirror, for example) reflects all the incident wavelengths, except for the narrow band of wavelengths which it reflects selectively, according to the optical axis of the laser cavity. Thus a wide-band laser may be obtained with a tunable gap.

According to a further, more frequent application, the Fizeau wedge is arranged so that it returns the narrow band of wavelengths, which it reflects selectively, according to the optical axis of the laser cavity. Thus a laser with a narrow tunable line may be obtained. For a particular incidence, the Fizeau wedge itself directly returns the desired part of the reflected beam according to the optical axis of the laser cavity.

In the case of a short-line laser, the Fizeau wedge can also take the place of an output mirror for the laser cavity. An advantageous laser cavity may thus be defined by a Fizeau wedge at one end and by a diffraction grating, which can be of small dimensions, at the other end.

In order further to improve the monomode aspect of the laser by eliminating the principal lines close to the desired line, another Fizeau wedge can be placed in the laser cavity and arranged for transmission onto the path of the laser beam and/or another Fizeau wedge may be provided as a reflecting surface in the laser cavity.

With one or several Fizeau wedges, the invention also makes it possible to obtain a tunable ring laser by a simple relocation of the wedge or wedges. Such ring lasers can thus improve the monomode operation by eliminating the spatial saturation in the light amplification medium.

Another particularly interesting application of the invention concerns lasers with two wavelengths which can be regulated separately.

Firstly, there is provided a narrow-line laser with optical selection by means of a Fizeau wedge. A second device is also provided which forms an optical selector arranged so as to receive the wavelengths other than the narrow band selectively reflected according to the optical axis by the Fizeau wedge. This second optical selector in turn returns another narrow band of wavelengths according to the optical axis of the laser cavity, which permits the laser cavity to be tuned separately to two different wavelengths.

The second optical selector device can be based on a diffraction grating, or, alternatively, on a Fizeau wedge used for reflection. In this latter case another zone of the first Fizeau wedge can be used.

More generally, the Fizeau wedge proposed as a selective optical device can serve in the majority of known applications of dispersive optical systems and can, for example, replace diffraction gratings.

Other objects and advantages of the invention will be apparent from the following description and the accompanying drawings, which are for the purpose of illustration only.

BRIEF DESCRIPTION OF THE DRAWINGS

FIG. 1A shows a beam spot reflected by a Fizeau wedge;

FIGS. 1B and 1C show two other spots reflected by a Fizeau wedge, with lateral fringes;

FIG. 2A shows schematically the intensity of energy in a beam of light;

FIG. 2B shows schematically the light reflected by a Fizeau wedge from such a beam for a resonant wavelength;

FIG. 2C shows schematically the paths of the light inside the Fizeau wedge;

FIG. 2D shows the light transmitted by the Fizeau wedge;

FIG. 3A shows the interaction of a divergent incident beam at two wavelengths with a Fizeau wedge;

FIGS. 3B and 3C show corresponding beam spots;

FIG. 4 shows a first example of a Fizeau wedge laser according to the invention;

FIG. 5 shows a variant thereof where the selective reflection takes place according to the direction of incidence;

FIGS. 6A to 6C show three different examples of laser emission spectra as a function of the angle of incidence on the Fizeau wedge;

FIG. 7A shows another application of the invention to a laser with one Fizeau wedge used for reflection and another for transmission in order to separate the principal categories of fringes;

FIG. 7B shows a variant of such a separation of categories of fringes, using two Fizeau wedges for reflection;

FIG. 8 shows the combined use of a Fizeau wedge and a diffraction grating in a laser;

FIG. 9 shows a ring laser which is tunable with the aid of a Fizeau wedge;

FIG. 10 shows a laser with two wavelengths which can be regulated separately, produced by Fizeau wedges;

FIG. 11 shows a variant thereof, in a more detailed manner;

FIG. 12 also shows a laser with two wavelengths, in which one and the same Fizeau wedge permits the selectivity for each of the wavelengths;
and FIG. 13 shows different adjustments permitted with the laser having two wavelengths according to FIG. 11.

DESCRIPTION OF PREFERRED EMBODIMENTS

It is known that a Fizeau wedge can be defined by two partially reflecting surfaces arrangement at a distance from one another which varies progressively. In general these are two plane surfaces which form a small angle between them (typically, several milliradians). In order to put the invention into effect, these surfaces may comprise a fine prism of the desired angle, with a reflective coating on its two faces (for mechanical reasons the prism can be borne on a sheet with which it is integral), or two sheets coated individually and held integrally with each other according to the angle chosen. In the latter case, a filler material of a suitable refractive index can be placed between the two sheets.

It has been observed that in reflection the Fizeau wedges can offer interesting possibilities of selectivity, provided that the reflectivity of the reflecting surfaces is great and their absorptive power low.

An incident laser beam with a narrow line and a variable wavelength is directed onto a Fizeau wedge. For the majority of wavelengths, a reflected laser spot is obtained in the form shown in FIG. 1A. For certain wavelengths, fringes known as fringes of equal thickness, situated outside the principal spot on the side opposite the tip of the wedge, are observed with the reflected laser spot on the surface of the wedge or close thereto as shown in FIGS. 1B and 1C. Between these two figures, the wavelength has been modified so as to displace these "secondary" fringes by a half-interval between fringes. More precisely, the angle of the Fizeau wedge in this instance is $\alpha = 3 \times 10^{-5}$ radians, its reflectivity $R = 0.99$ and its thickness at the point of reflection $e = 20$ $\mu$m. The diameter of the spot is 700 $\mu$m, the divergence of the laser $2\delta = 10$ milliradians and the angle of incidence on the Fizeau wedge is $\theta = 5°$.

It has also been observed that the wavelengths $\lambda_o$ for which these secondary fringes occur substantially obey the equation:

$$k \cdot \lambda_o = 2 \cdot e \cdot \cos \theta$$

where k is a whole number relative to the order of the reflection.

The intensity of the incident light is shown schematically in FIG. 2A. The behavior of the fringes of reflection is shown schematically in FIG. 2B where it will be observed that the intensity of the first reflected fringe is comparable to that of the directly reflected beam (without interference). FIG. 2C shows schematically the multiple reflections occurring within the Fizeau wedge. And FIG. 2D shows the intensity of the light transmitted by the latter.

It has also been observed that the beam reflected by the Fizeau wedge has become a little more divergent than the incident beam as a result of the multiple reflections which occur in the wedge. Within this zone of divergence, the direction in which a given secondary fringe appears depends upon the wavelength. In other words, a Fizeau wedge has an angular dispersion, as shown by FIGS. 1B and 1C obtained for two different and neighboring wavelengths.

Over a sweep interval wavelength of 0.3 nm, the fringes are displaced, moving from the interior of the principal spot to its immediate proximity.

The fringes were observed on a screen situated 3.7 meters from the wedge, on the reflected laser beam (divergence of the laser at incidence $2\delta = 6$ mrad, angle of incidence $\theta = 3°$). A displacement in wavelength of 0.085 nm is translated by a distance of 5 mm on the screen. The equivalent angular dispersion is therefore 0.016 rad/nm. Similar observations were made both with a laser with pulses of 2 nanoseconds and a continuous-wave laser with a colorant.

Other comparable observations are shown schematically in FIGS. 3A to 3C. In FIG. 3A, $I_o$ designates the intensity of a divergent incident laser beam. This intensity is the same for two different wavelengths $\lambda 1$ and $\lambda 2$ which the laser beam contains.

For the wavelength $\lambda 1$, close to "resonance" in the Fizeau wedge ($k\lambda 1 = 2e \cos \theta$), a great angular dispersion of the reflected beam appears (FIG. 3B). Several peaks of intensity—secondary fringes—occur, certain of which are outside the actual impact spot of the laser beam. The first maximum can greatly exceed the rest in intensity. It seems that the form of the fringes depends not only on parameters relating to the Fizeau wedge itself ($\alpha$, R, e, $\theta$), but also on the transverse profile of the intensity of the incident beam.

Because of the divergence of the reflected laser beam, essentially linked with that of the incident beam, the localized fringes on the Fizeau wedge appear "amplified" and are easily visible to the naked eye several meters from the wedge. The application of these brilliant fringes reflected by the Fizeau wedge in order to obtain a selective and adjustable retroaction in a laser cavity will now be described.

In FIG. 4 the reference $M_1$ designates a semitransparent mirror (in the direction of the lasers) which closes one of the ends of the laser cavity. The cavity contains, in a tank, a coloring medium COL which is capable of optical pumping. The means for excitation of the colorant tank are not shown. A Fizeau wedge CF which is interesected at P by the axis of the laser cavity is placed on the opposite side of the colorant tank COL to the mirror $M_1$.

This results in a divergent distribution of reflected energy, represented by spots (TP, TF) of contours similar to those shown in FIGS. 1B, 1C or 3B. A total reflection mirror $M_2$ is arranged so as to return the reflected beam to the Fizeau wedge.

In the position A of the mirror $M_2$, it is the principal spot TP which is returned at P to the Fizeau wedge, i.e., in the laser cavity. The laser then functions in a wide band including wavelengths other than those which obey the approximate equation $k\lambda_o \simeq 2e \cos \theta$. At this wavelength, a gap appears in the wide band. The position of the gap or gaps in the spectrum can be regulated by relocating the Fizeau wedge in its plane.

If, instead of placing the mirror $M_2$ perpendicular to the direction PA of the reflected laser beam without interferences, the mirror is arranged perpendicular to the direction PB of the first brilliant fringe of reflection TF (which corresponds to a precise wavelength $\lambda_o$), the laser emission is tuned to this wavelength, which can also be adjusted by relocation of the Fizeau wedge as above. By slightly modifying the angle of the mirror $M_2$ it is thus possible to take advantage of the angular dispersion in wavelength, around $\lambda_o$, described above.

It has also been observed that for a particular value of the angle of incidence $\theta$ on the wedge, the latter has a coefficient of reflection which is selected in frequency in the direction of incidence. With a wedge of the type described above, this angle of incidence is of the order of a milliradian. A very short cavity is obtained using this observation, as shown in FIG. 5; the Fizeau wedge CF returns the first brilliant fringe TP along the axis of the laser cavity defined in other respects by the colorant tank COL and the semi-transparent mirror $M_1$ which preferably has a slightly inclined rear face. The selectivity is advantageously further augmented by arranging one or several diaphragms on either side of the colorant tank.

EXAMPLE 1

A Fizeau wedge was produced with the aid of two sheets of glass 10 mm thick and 40 mm in diameter. These sheets were provided with a multi-dielectric coating giving a coefficient of reflection R=0.99. Such sheets can be obtained for example from the optics division of the French company MATRA. These sheets were separated by an air gap of a thickness e=20 $\mu$m. The vertical adjustment of the edge of the wedge was obtained by observation of the Fizeau fringes. The interfringe was fixed at 10 mm, which corresponds to an angle $\alpha = 3.10^{-5}$ rad for $\lambda = 0.6$ $\mu$m. The laser cavity used was arranged as in FIG. 5 and was 8 cm long. The colorant tank provided a path of 10 nm, pumped by the focused beam of a nitrogen laser emitting pulses of 2 ns at a frequency of 10 Hz. The output mirror $M_1$ was an uncoated plate with an angle of 4° between the entry face and the output face. Two 0.3 mm diaphragms were placed on either side of the colorant tank. The output laser spectrum was observed with the aid of a double monochromator SPEX 1400 equipped with a multi-channel optical analyzer. The output energy was measured with the aid of a Joulemeter RK 3232 (LPC).

By adjusting the wedge and the output mirror in order to obtain the maximum laser energy, a wide-band emission is obtained which is spread over 5 nm, with a narrow gap, as shown in FIG. 5. The divergence of the laser beam is thus approximately 6 mrad. If the whole wedge is pivoted by 3 milliradians, emission changes from a wide band to a narrow line (FIG. 6C). For an intermediate angle of 1.5 mrad (FIG. 6B), a combination of the wide band, narrow gap and the narrow line peak is obtained. For the best spectrum condensation obtained, with the pivoting of +3 mrad (FIG. 6C), the intensity of the wide band was less than two thousandths of the intensity of the peak line. When diaphragms of 0.5 mm are used, more than 50% of the energy over all the band (10 $\mu$J) is condensed over a line width of 0.1 nm. With diaphragms of 0.3 nm, the line width can be reduced to 0.01 nm (measured with a 4 mm Fabry-perot calibrator), and the energy yield in condensation remains approximately 10%.

A variable tuning of this line (narrow band) over more than 10 $\mu$m, i.e., more than the width of the total band, could be obtained by relocation of the wedge. With the wedge angle used, a relocation by 1 $\mu$m is translated by a shift of $8.10^{-4}$ nm in the wavelength of the line. With the Fizeau wedge used (useful diameter 30 mm), a possible tuning rang is established over 24 nm.

In addition to the advantage that it permits shorter laser cavities and consequently better monomode functioning, the Fizeau wedge offers the further advantage that it easily achieves a response time of less than a nanosecond. The response time is defined by $\tau = T/\ln 1/R$, where T is the mean there-and-back time in the wedge. This gives $\tau = 13$ ps for R=0.99. Thus a very high degree of spectrum condensation is achieved, even with very short pumping pulses such as are found, for example, when using a nitrogen laser.

Because it makes the transition very easily and with great reproducibility from wide band emission to emission with a narrow peak, the device according to the invention is of interest in photoluminescence and instrumentation in laser spectroscopy. The wide laser spectrum with narrow tunable gap can be used for the selective excitation of types of atoms or molecules with narrow line absorption.

Other particular applications of the Fizeau wedge in lasers will now be described.

FIG. 7A shows an output mirror $M_1$ and a colorant tank COL which can be excited by means which are not shown. On the left-hand side, the end of the laser cavity is defined by the Fizeau wedge $CF_1$, but in front of this there is located a second Fizeau wedge $CF_2$ which acts for transmission. It will be noted that the angles of the wedges $CF_1$ and $CF_2$ are $\alpha$ and $\alpha$, respectively, and their thicknesses at the position of the laser beam are e and e'. The use of the second wedge $CF_2$ makes it possible to eliminate the neighboring principal lines, at the tuning frequency, when $(e/\alpha)=(e'/\alpha')$. The tuning frequency is automatically preserved by combined relocation of the two wedges integrally.

FIG. 7B shows another example of separation of the lines in a laser cavity, this time by using two Fizeau wedges for reflection. The wedge $CF_1$ remains on the left while another wedge $CF_2$ replaces the mirror $M_1$ on the right of the laser cavity. The colorant tank COL is placed between the two wedges. The reflected beam is extracted by a total reflection mirror MR. Once the tuning conditions are achieved, the tank can be displaced perpendicularly to the optical axis of the cavity, which assures the automatic regulation of the two Fizeau wedges (ie $e/\alpha=(e'/\alpha')$).

In certain circumstances the mirror can be omitted. In fact, it has been observed that the Fizeau wedge can also take the place of the output mirror to the laser cavity when the latter functions with a narrow line. This possibility is shown in FIG. 8, where the laser cavity, with the colorant COL, comprises at one end a diffraction grating in the Littrow arrangement (marked RL) and at the other end a Fizeau wedge CFS. The latter is preferably chosen quite thick so as to give very fine lines which, on the other hand, are quite close to each other. The selectivity of the grating makes it possible to isolate one of these lines. This structure is of interest particularly because of its simple arrangement which only requires a grating of very small dimensions.

FIG. 9 shows another variant intended most particularly to favor the monomode functioning of the laser, starting from a ring laser structure. Here the ring laser comprises a wedge CF, an output mirror $M_1$ and another, semi-transparent mirror $M_2$, followed by a total reflection mirror MR. The colorant tank is placed between $M_1$ and CF, its excitation means not being shown. A relocation of the Fizeau wedge CF in its plane permits regulation of the laser frequency. Such a unidirectional ring laser eliminates the problems associated with spatial saturation in the amplification medium, and thus facilitates monomode operation. Naturally, several Fizeau wedges could be used as mirrors, instead of just one.

There will now be described examples of Fizeau wedge lasers which can be separately tuned to two different wavelengths.

A first structure is shown in FIG. 10. The cavity functions, between the output mirror $M_1$ and the wedge $CF_1$, for a wavelength $\lambda 1$ with a rectilinear path passing through the colorant tank. According to the explanation above relating to Fizeau wedges, other wavelengths will be reflected by $CF_1$ at a different angle. A total reflection mirror MRP which is perforated to allow the rectilinear beam to pass between $M_1$ and $CF_1$ will return the other wavelengths to a second Fizeau wedge $CF_2$ which selectively returns a wavelength $\lambda 2$ to MRP and $CF_1$ so that it finally re-enters the optical axis between $CF_1$ and $M_1$. It will be seen that the relocation of $CF_1$ in its plane tunes $\lambda 1$, while that of $CF_2$ tunes $\lambda 2$. It would be noted that for $\lambda 2$ the Fizeau wedge $CF_1$ is a mirror reflecting 99%, a level which it is impossible to achieve by the known methods of producing a laser with two wavelengths which can be regulated separately.

FIG. 11 shows a structure generally similar to that of FIG. 10, but with the second Fizeau wedge $CF_2$ replaced by a second selective reflector of any type, such as a diffraction grating. The drawing shows in greater detail the structure of the laser, which can be applied to all the cases described above. Between the wedge $CF_1$ and the semi-transparent output mirror $M_1$, with a rear face inclined at 4°, there is placed a tank of colorant col which is excited by pumping through a convenient optical focusing system L, such as a cylindrical lens. A diaphragm D is placed between the tank COL and the Fizeau wedge $CF_1$.

The wavelength $\lambda 1$ the (reflected first secondary fringe from the wedge $CF_1$ i.e., spot TF) travels to and fro between $CF_1$ and $M_1$. The remainder of the wavelengths included in one single principal spot TP is deflected by a small angle and picked up by the total reflection prism P for passage to the second selective reflector which only reflects the wavelength $\lambda 2$; the latter returns by the same route so as to re-enter the optical axis between $CF_1$ and $M_1$. The output mirror $M_1$ then supplies two wavelengths $\lambda 1$ and $\lambda 2$ which can be regulated separately, one by relocation of $CF_1$ in its plane, the other by the action of the second regulatable selective reflector SSR.

For this purpose the Fizeau wedge $CF_1$ is mounted so as to be displaced by a small angle $\theta$ with reference to the normal incidence of the laser beam ($M_1-CF_1$). A particular value of $\theta$ (several milliradians) corresponds to the Littrow incidence for the diffraction grating SSR. The grating then only returns a single wavelength $\lambda 2$ in the same direction. It will be seen that the relocation of $CF_1$ in its plane only modifies the "thickness of resonance" of the wedge and thus $\lambda 1$. The tuning by relocation is linear with regard to the units of wavelength.

EXAMPLE 2

This example relates to the structure of FIG. 11. The wedge $CF_1$ is placed in the cavity of a Rhodamine 6G laser in ethanol, pumped by a nitrogen laser at 100 KW. The wedge $CF_1$ consists of two mirrors of 0.99 reflectively, separated by 20 $\mu$m at the level of the beam and forming an angle of $\alpha=6$ seconds. The angle of incidence of the laser beam (path $M_1-CF_1$ equals 9 cm) on the wedge is $\theta=6$ milliradians. The second dispersing device SSR is a diffraction grating with 2400 lines/mm oriented at the Littrow incidence. (Naturally one could use additional optical systems, or the grazing incidence on the grating). The diaphragm D is 0.4 mm.

The selective reflection due to $CF_1$ itself gives a first laser line at $\lambda 1$ with a width of 0.02 $\mu$m (measured with a 4 mm Fabry-Perot calibrator). This line can be displaced by relocation of the wedge to 9 nm. Three different tunings of $\lambda 1$ are shown in FIGS. 13A to 13C, with $\lambda 2$ fixed. As above, the observations were made with a SPEX monochromator equipped with an optical multichannel analyzer. The lines $\lambda 1$ are redrawn starting from points situated at the limit of the resolution of the apparatus. Their amplitude in the drawing is not therefore representative.

For its part, the tuning to the line $\lambda 2$ due to the grating SSR is wider (0.5 nm), and this line can be displaced over 40 nm. Three different tunings are shown in FIGS. 13D to 13F, and $\lambda 1$ fixed.

The intensity of each of the lines can be modified by changing the vertical adjustment of the wedge or the grating. Besides this, the peak intensity of the line $\lambda 1$ due to the wedge $CF_1$ can be greater by more than one order of magnitude than that of the line $\lambda 2$ due to the grating SSR. With an optimum adjustment in energy for the two lines (in this case 581.5 and 583.0 nm), the energies measured on the Joulemeter RK 3232 were 3.4 μJ for λ1 and 7.8 μJ for λ2. Taking account the duration of the pulse, equal to 1.6 ns, this corresponds to a power of several kilowatts.

It will be noted that the energies of the two lines are comparable, but that the line λ1 due to the wedge is much narrower than the other. This shows clearly the importance of the Fizeau wedge as a device for tuning fine lines. If the Fizeau wedge is replaced by a total reflection mirror, the output energy of the laser, in a wide band, is 30 μJ. It will also be noted in FIG. 13 that the two lines can be tuned completely independently of each other, despite the use of an unsophisticated experimental mechanism for the tunings.

FIG. 12 shows a variation on the structure of FIG. 11. In this case, one single Fizeau wedge serves to tune the two lines independently. The beam picked up by the total reflection prism P is returned by a total reflection mirror m to a second zone J on the Fizeau wedge, some distance from the zone I where the selective reflection for λ1 takes place. The reflection from m to J takes place in a direction parallel to that of the optical axis of the laser (from I to $M_1$).

In order to adjust λ1, the Fizeau wedge $CF_1$ is relocated in its plane integrally with the mirror m. In order to adjust λ2, the wedge $CF_1$ remains fixed, and the mirror m is relocated parallel to the front face of the wedge (or plane of the wedge), this mirror thus remaining parallel thereto.

With the same wedge as for Example 2, two lines 0.02 nm wide were obtained which could be tuned independently over more than 5 nm, the limit imposed by the mechanics of relocation. The two lines can be brought very close to one another, and even into coincidence. Since the two different wedge thicknesses at I and J can be used with two different categories with the wedge angle $\alpha = 3.10^{-5}$ radian and $\lambda 2 = 0.6$ μm, the successive Fizeau fringes are, on the wedge, separated by 1 cm, and spectrally for e=20 μm) by 9 nm. The power is approximately the same in both lines i.e., several kilowatts.

The lasers with two variable wavelengths thus obtained offer the advantage that they have practically no losses at the level of the beam separation, effected in the cavity, while they may have very narrow lines, if necessary, and these may have a wide tuning range. Such lasers may be of particular use in the measurement of atmospheric pollution using LIDAR techniques. Thus one of the lines is chosen to be absorbed by the substance to be detected, while the other, of neighboring frequency, serves as a reference for intensity.

Having described several preferred applications of the Fizeau wedge to lasers, it is convenient to recall the following advantages offered:

selective, directional and angularly dispersive reflection about a chosen wavelength while forming a high reflectivity mirror for the other wavelengths;

the displacement of relocation which serves to modify the chosen tuning wavelength does not modify either the direction of return of this chosen wavelength or that of the other wavelengths;

no spatial deformation of the reflected beam formed by these other wavelengths.

These advantages mean that the Fizeau wedge can be used in numerous other applications, most frequently those concerned with a fine beam (at least, in one dimension), and preferably with a slightly divergent beam. However, there is little doubt that lasers make the best possible use of these advantages.

What is claimed as new and desired to be secured by Letters Patent of the United States is:

1. An optical device of the Fizeau wedge type having two partial reflection surfaces for reflecting a beam of light and defining a reflecting Fizeau wedge, said partial reflecting surfaces being oriented at a small angle with respect to each other such that the distance from one surface to the other surface varies progressively, the reflectivity R of each of said surfaces being greater than 0.6, while the absorptive power of said surfaces is low, thereby enabling said reflecting Fizeau wedge to produce a selective feedback of components of said beam of light.

2. A device according to claim 1, in which R is greater than 0.9.

3. A device according to claim 2, in which R is close to 0.99.

4. A device according to claim 3, further comprising means for directing a beam of light onto one of said surfaces of said Fizeau wedge with a predetermined angle of incidence, said Fizeau wedge reflecting a first group of wavelengths in a narrow band in a first direction and reflecting a second group of wavelengths surrounding said first group in a second direction wherein, said second direction is the direction of reflection on a mirror corresponding to an anode of reflection equal to said angle of incidence.

5. A device according to claim 4, wherein said beam incident on said Fizeau wedge is divergent.

6. An optical device of the Fizeau wedge type having two partial reflection surfaces for reflecting a beam of light and defining a reflecting Fizeau wedge, said partial reflecting surfaces being oriented at a small angle with respect to each other such that the distance from one surface to the other surface varies progressively, the reflectivity R of each of said surfaces being greater than 0.6, which the absorptive power of said surfaces is low, thereby enabling said reflecting Fizeau wedge to produce a selective feedback of components of said beam of light; said device forming one of two reflecting walls of a cavity enclosing a laser having an optical axis.

7. A device according to claim 6, wherein said laser cavity contains a light amplification laser active medium with colorant.

8. A device according to claim 7, wherein a perforated diaphragm is interposed between said Fizeau wedge and said light amplification laser active medium.

9. A device according to claim 8, wherein said Fizeau wedge is oriented to return said first group of wavelengths along said optical axis of said laser cavity.

10. A device according to claim 9, wherein said Fizeau wedge is arranged so that it directly returns said first group of wavelengths along said optical axis of said laser cavity.

11. A device according to claim 10, wherein said Fizeau wedge serves as an output mirror for said laser cavity.

12. A device according to claim 11, comprising a diffraction grating opposite said Fizeau wedge in said laser cavity.

13. A device according to claim 11, further comprising a second Fizeau wedge arranged for transmission of the said laser beam.

14. A device according to claim 13 or claim 1, comprising means which act as an optical selector and are arranged so as to receive said second group of wavelengths reflected along said optical axis, said second selector also being arranged to return another narrow band of wavelengths along said optical axis of said laser cavity, thereby permitting said laser cavity to be tuned separately to two different wavelengths.

15. A device according to claim 14, wherein said second optical selector includes a diffraction grating.

16. A device according to claim 14, wherein said second optical selector includes a second Fizeau wedge.

17. A device according to claim 14, wherein said second optical selector device comprises another zone of said first Fizeau wedge.

18. A device according to claim 11, comprising a second Fizeau wedge as a reflecting wall in said laser cavity.

19. A device according to claim 8, wherein said Fizeau wedge is oriented so as to return said second group of said wavelengths along said optical axis of said laser cavity.

* * * * *